US008131619B1

(12) United States Patent
Veselka (10) Patent No.: US 8,131,619 B1
(45) Date of Patent: Mar. 6, 2012

(54) SERVICE FEE-BASED PAYMENT PROCESSING

(76) Inventor: Randall D. Veselka, Littleton, CO (US)

( * ) Notice: Subject to any disclaimer, the term of this patent is extended or adjusted under 35 U.S.C. 154(b) by 0 days.

(21) Appl. No.: 13/076,562

(22) Filed: Mar. 31, 2011

Related U.S. Application Data

(63) Continuation-in-part of application No. 11/753,351, filed on May 24, 2007, and a continuation-in-part of application No. 11/753,358, filed on May 24, 2007, now abandoned.

(51) Int. Cl.
*G06Q 40/00* (2012.01)
(52) U.S. Cl. .......................... 705/35; 705/38
(58) Field of Classification Search ...................... 705/35
See application file for complete search history.

(56) References Cited

U.S. PATENT DOCUMENTS

| | | | |
|---|---|---|---|
| 2002/0056746 A1 | 5/2002 | Glaser | |
| 2002/0179401 A1* | 12/2002 | Knox et al. | 194/217 |
| 2004/0193537 A1 | 9/2004 | Knapp | |
| 2006/0059087 A1 | 3/2006 | Smith et al. | |
| 2006/0111956 A1 | 5/2006 | Whitesage | |
| 2006/0149671 A1 | 7/2006 | Nix et al. | |
| 2007/0051794 A1 | 3/2007 | Glanz et al. | |
| 2007/0241183 A1 | 10/2007 | Brown et al. | |
| 2008/0010213 A1 | 1/2008 | Roth | |
| 2008/0052177 A1 | 2/2008 | Walker et al. | |
| 2008/0275760 A1 | 11/2008 | Easterly et al. | |

OTHER PUBLICATIONS

McClatchy-Tribune Regional News Cash-for-gas bill now law. Jun. 8, 2008 by David Krechevsky.*
"Top Australian Bank Regulator Defends Interchange Regulation", Digital Transactions—Trends in the Electronic Exchange of Value, Dated Aug. 16, 2005, Internet site http://www.1800bankcard.com (2 pages).
"Convenience Fee", Copyright © Official Payments Corporation, Internet site http://www.officialpayments corp.com (1 page).
"Rumblings From the Public Sector" by Richard Mitchell, Merchant Acquiring, Credit Card Management pp. 18-22 (3 pages).
"Pop Wordige for Visual Gov Solutions, LLC." Flyer (1 page).
"Interchange Litigation Moves Forward, Cases Consolidated", News, p. 59 (1 page).
"Discover to Drop 'No Surcharge' Ban", News, pp. 96-97 (1 page).
"More Aussie Retailers Plan Surcharges for Credit Card Payments", Digital Transactions—Trends in the Electronic Exchange of Value, Dated Mar. 27, 2006, Internet site http://www.1800bankcard.com (1 page).
"Report Sees Heavier Pressure to Cut Interchange" by Isabelle Lindenmayer, American Banker, Wednesday Mar. 29, 2006, p. 12 (1 page).
Non-Final Office Action dated Oct. 5, 2010 in U.S. Appl. No. 11/753,358. (21 pages).
Office Action dated Jan. 22, 2009 in U.S. Appl. No. 11/753,351. (11 pages).

(Continued)

*Primary Examiner* — Ella Colbert
*Assistant Examiner* — John Anderson
(74) *Attorney, Agent, or Firm* — Rader, Fishman & Grauer PLLC (57) ABSTRACT

A computing device that includes a processor and a memory receives inputs including indications of a transaction amount and a type of transaction. It is determined whether the transaction amount exceeds a predetermined threshold. Further, it is determined whether the type of transaction is one of a cash transaction and a payment card transaction. If the type of transaction is a cash transaction and the transaction amount exceeds the predetermined threshold, a predetermined service fee is added to the transaction amount, and a predetermined discount is subtracted from the transaction amount.

22 Claims, 5 Drawing Sheets

OTHER PUBLICATIONS

Response to Office Action dated Jan. 22, 2009 in U.S. Appl. No. 11/753,351. (10 pages).
Final Office Action dated Jul. 10, 2009 in U.S. Appl. No. 11/753,351. (20 pages).
Response to Final Office Action dated Jul. 10, 2009 in U.S. Appl. No. 11/753,351. (15 pages).
Response to Non-Final Office Action dated Oct. 14, 2009 in U.S. Appl. No. 11/753,351. (15 pages).
Non-Final Office Action dated Oct. 14, 2009 in U.S. Appl. No. 11/753,351. (15 pages).
Declaration of Randall Veselka (2 pages).

* cited by examiner

FIG. 1

Fee matrix 140

| Service fee 205 | Threshold. 210 | Cash discount 211 | Interchange / proc. fee 215 | Other costs 220 | Total trans. cost 225 |
|---|---|---|---|---|---|
| | | | | | |

FIG. 2

Batch report 300

| Terminal 1 | |
|---|---|
| Trans. type 1 amount | |
| Trans. type 2 amount | |
| Trans. type 3 amount | |
| Number of transactions | 305a |
| Total transaction amount | |
| Total service fees | |
| Net deposit amount | |
| Total cash discounts | |
| Terminal 2 | |
| ... | 305b |
| Terminal 3 | |
| ... | 305c |
| Totals | |
| Total transaction amount (all terminals) | |
| Total service fees (all terminals) | 310 |
| Total cash discounts (all terminals) | |

SERVICE FEE-BASED PAYMENT PROCESSING

RELATED APPLICATIONS

This application is a continuation-in-part of co-pending United States patent application entitled "SERVICE FEE-BASED PAYMENT PROCESSING," Ser. No. 11/753,351, filed May 24, 2007, and co-pending United States patent application entitled "PAYMENT TERMINAL PROCEEDING," Ser. No. 11/753,358, also filed May 24, 2007, which co-pending applications are hereby fully incorporated herein by reference in their entireties.

BACKGROUND

Payment cards, e.g., debit cards, credit cards, and the like, provide a convenient and widely used payment mechanism at merchant locations around the world. Consumers do not generally pay a separate or explicit fee for the use of payment cards. However, a merchant generally pays a percentage-based transaction fee in order to receive payment on the transaction. For example, the merchant generally pays a fee, sometimes referred to as an interchange fee, to an issuing institution, e.g., a bank issuing a credit card. Further, the merchant generally pays a processing fee to a processor handling a transaction on behalf of the issuing institution. The interchange fee and also the processing fee are generally based on a percentage of the transaction's value, and hence constitute a percentage-based transaction fee.

A merchant may conduct many transactions in which a payment card is not used, even as a payment card is used for some of the merchant's transactions. For example, many merchants accept cash or checks in addition to payment cards. Others may also or alternatively send invoices to their customers. In any event, because percentage-based transaction fees must be paid by a merchant, the merchant may offer goods and services at a higher price than would otherwise be the case in order to pay transaction fees for transactions in which a customer uses a payment card. Further, payment card issuers generally do not allow merchants paying a percentage-based transaction fee to charge payment card customers a different price for goods and services than other customers, e.g., cash customers, pay. Therefore, merchants generally price goods and services for all transactions to accommodate the subset of transactions in which a consumer uses a payment card.

DETAILED DESCRIPTION OF THE PREFERRED EMBODIMENTS

System Overview

Figure 1:
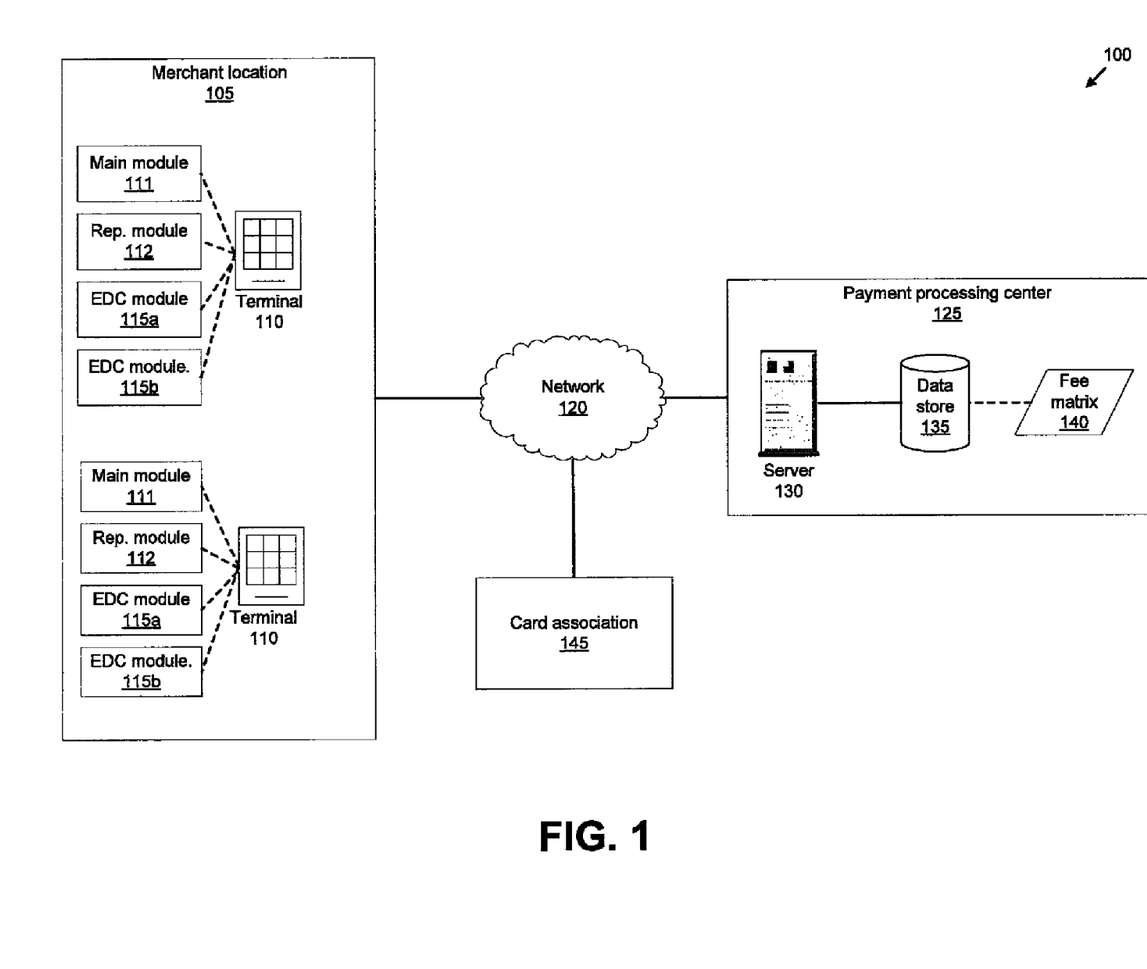
FIG. 1 illustrates an exemplary system for conducting a transaction.

FIG. 1 illustrates an exemplary system 100 for conducting a transaction. For example, the system 100 may be an integrated point of sale system. A merchant 105 includes one or more payment terminals 110, which in turn each include various sets of program instructions, such as a main module 111, a reporting module 112, and one or more electronic draft capture (EDC) modules 115. For payment card transactions, terminals 110 communicate with a payment processing center 125 via a network 120. Payment processing center 125 generally includes a processing server 130 and a data store 135. Card association 145 may also be in communication with payment processing center 125 via the network 120, or some other network.

Merchant 105 may include a location, or a set of locations, associated with a particular entity, e.g., a particular business, including one or more payment terminals 110. Further, as stated below, merchant 105 may be a virtual merchant with virtual terminals 110. Although only one merchant 105 is illustrated in FIG. 1, it is to be understood that, in general, system 100 is likely to include tens, hundreds, thousands, or even more, merchants 105, each merchant 105 including one or more terminals 110.

Payment terminal 110 may be a virtual terminal, i.e., a customer may purchase goods or services through a website or the like and may provide information sufficient to pay for the goods or services using a payment card through a form or the like provided within the website. However, where payment terminal 110 is a physical device located within a merchant 105, payment terminal 110 may be a device such as the NURIT 2085 or NURIT 8320, both sold by VeriFone, Inc. of San Jose, Calif., or a terminal sold by Dejavoo Systems of Syosset, N.Y. Further for example, operations of payment terminal 110 may be provided by an integrated point-of-sale system, such as IRIS, sold by XPIENT Solutions of Charlotte, N.C., or integrated point-of-sale systems sold by Documentor, Inc. of Fayetteville, Ga., or MICROS Systems of Columbia, Md. Accordingly, in addition to EDC modules 115, payment terminal 110 may include software provided by VeriFone such as the NURIT operating system (NOS) and the NURIT Control Center (NCC).

A single payment terminal 110 is generally configured to process cash transactions and/or transactions using different kinds of payment cards, e.g., credit cards and debit cards. For example, a payment terminal 110 may be configured to process Visa, American Express, Discover, and MasterCard credit cards, as well as debit cards usable through networks provided by Visa, MasterCard, Star System, Pulse, etc.

Main module 111 includes program instructions for performing operations such as described below. For example, main module 111 includes instructions for obtaining information concerning whether a transaction is a cash transaction or a payment card transaction, obtaining information from a payment card, e.g., by reading a magnetic strip of a payment card, detecting a type of payment card, and invoking an EDC module 115, among other operations.

Reporting module 112 includes program instructions for generating reports such as batch report 300, discussed further below with respect to FIG. 3.

EDC modules 115 and other program instructions included in terminals 110 may be created according to any one of a variety of known programming technologies, such as the C programming language. For example, the MetaWare Compiler, sold by ARC International of San Jose, Calif. and St.

Albans, United Kingdom, may be used to compile and link code for EDC modules 115 and/or other modules in terminal 110. Operations carried out at least in part according to instructions included in one or more EDC modules 115 are described in more detail below.

Network 120 is a packet network and is generally an internet protocol (IP) network. As such, network 120 generally uses one or more known protocols for transporting data, such as user datagram protocol (UDP), transport control protocol (TCP), hypertext transfer protocol (HTTP), etc. Further, network 120 may include a variety of networks such as a wide area network (WAN), e.g., the Internet, a local area network (LAN), etc. In some cases, an addition or alternative to network 120 may be created by instantiating a dial up connection over conventional telephone lines, e.g., between data center 120 and card association 140. In general, packet network 120 may be used to transport a variety of digital data.

Payment processing center 125 generally includes a payment server 130 and a payment data store 135. Further, it is to be understood that, for purposes of efficiency, scalability, and redundancy, payment processing center 125 generally includes multiple devices performing operations ascribed herein to payment server 130 and payment data store 135. Payment server 130 and payment data store 135 may include various computer-readable media that include instructions for performing some or all of the operations described herein. Payment processing center 125, generally via server 130, may be in communication with terminals 110 and card association 145 via one or more networks such as network 120.

Card association 145 as illustrated in FIG. 1 represents a processing center of a payment card provider, e.g., Visa, MasterCard, etc. It is to be understood that the system 100 will generally include multiple card associations 145, although only one card association 145 is illustrated in FIG. 1 for convenience and ease of explanation herein. As described further below, payment processing center 125 may communicate with card association 145 for various purposes, such as authorizing payment card transactions requested from a merchant 105, settling transactions with card association 145, etc.

Computing devices such as terminals 110, server 130, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., the Linux operating system, and the NURIT operating system (NOS) mentioned above. Computing devices may include any one of a number of known computing devices, including, without limitation, a point of sale terminal, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein such as data store 140, may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and is accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Fee Table

Figure 2:
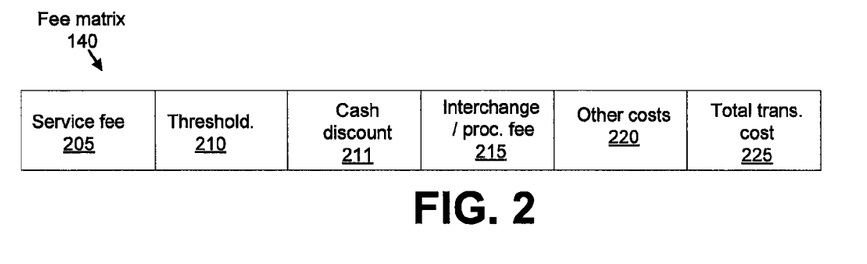
FIG. 2 illustrates an exemplary fee table.

FIG. 2 illustrates an exemplary fee table 140. As shown in FIG. 2, fee table 140 includes the following columns or fields: a service fee 205, a transaction threshold 210, a cash discount 211, an interchange/processing fee 215, other costs 220, and a total transaction cost 225.

Service fee 205 is a flat fee, i.e., a fee of a predetermined amount where the fee is not determined by the amount of a transaction and in fact is independent of the amount of the transaction, except that a service fee 205 may be imposed only when a transaction amount exceeds a threshold 210. As used herein, the term "transaction amount" refers to an amount billed to and/or paid by a customer for goods and/or services being purchased, the transaction amount possibly also including applicable taxes, but being calculated before the service fee 205 or a cash discount 211 is applied. The terms "total amount" or "total transaction amount" are used to indicate a transaction amount plus any service fee and the less any applicable discount. Thus, a transaction amount and the corresponding total transaction amounts are the same where there is no service fee or applicable discount.

Service fee 205 may be paid, by a customer, to merchant 105 as consideration for in-store services, and generally is applied regardless of a type of transaction e.g., regardless of whether the transaction is a cash transaction or a payment card transaction, which service fee 205 is ultimately collected by payment processing center 125.

Cash discount 211 is an amount of a discount that may be applied where a type of transaction is a cash transaction. The cash discount 211 is generally applied only for transactions where the transaction amount is in excess of the threshold 210. Further, the Cash discount 211 is generally greater than the service fee 205. Therefore, in absolute terms, a customer in a cash transaction generally pays a smaller total amount than a customer in a payment card transaction even if the cash transaction and the payment card transaction would otherwise have had equal transaction amounts.

The threshold 210 for imposing a service fee 205 and providing the cash discount 211 generally applies regardless of a type of the transaction to which it is applied. The threshold 210 may be different within the system 100 for different merchants 105, and is generally determined according to considerations pertaining to a merchant 105, such as an average transaction amount associated with the merchant 105, average prices of individual items sold by the merchant 105, etc. For example, merchants 105 with relatively higher average transaction amounts generally will have the threshold 210 sets relatively higher than merchants 105 with relatively lower average transaction amounts.

Interchange/processing fee 215 is generally determined by card association 145, and represents an amount to be paid to card association 145 by processing center 125 as consideration for completing a payment card transaction. Interchange/processing fee 215 is generally based on a percentage of a total transaction amount, although the percentage is not generally dependent on the total transaction amount. Accordingly, interchange/processing fee 215 sometimes may be calculated simply by multiplying a total transaction amount by the percentage specified by a card association 145. Often, however, interchange/processing fee 215 is the sum of a predetermined constant and the product of a total transaction amount and a percentage specified by a card association 145. One purpose of the predetermined constant is generally to ensure that a transaction fee does not fall below a predetermined threshold even for very small transactions. For example, if the interchange/processing fee 215 is based on a percentage of three percent, transaction amounts of one dollar and two dollars respectively would result in interchange/processing fees 215 of three cents and six cents respectively. However, including a predetermined constant of twenty-five cents significantly increases the foregoing interchange/processing fees 215 to twenty-eight cents and thirty-one cents respectively. In any event, in general, interchange/processing fee 215 will increase in direct proportion to a transaction amount.

Other costs 220 represent costs for a payment card transaction other than interchange forward/processing fee 215 that must be paid to a card association 145 by payment processing center 125. For example, payment processing center 125 may pay agent's fees or commissions to agents or sales representatives who assist in obtaining merchants 105 as customers. Such fees or commissions may be included in other costs 220.

Total transaction cost 225 includes the sum of interchange/processing fee 215 and other costs 220.

Process Flows

Figure 4:
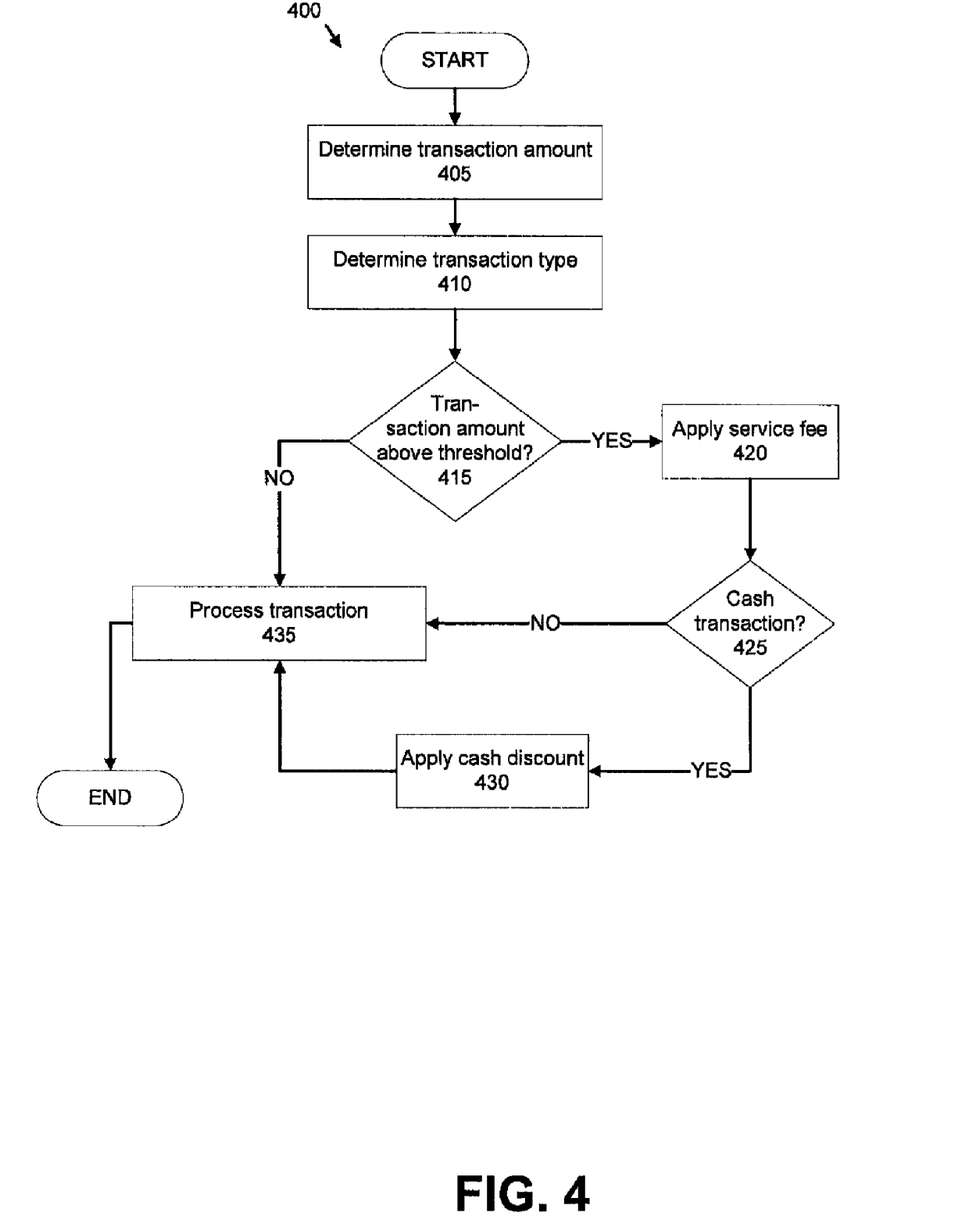
FIG. 4 illustrates an exemplary process for using an electronic draft capture (EDC) to process a payment card transaction in a terminal.

FIG. 4 illustrates an exemplary process 400 for using an EDC module 115 to process a payment card transaction in a terminal 110. Terminal 110 generally includes a processor and a computer-readable medium that includes instructions executable by the processor for carrying out operations described herein, including operations in process 400. For example, such instructions may be included in main module 111.

Process 400 begins in a step 405 in which the EDC module 115 determines a transaction amount. Generally, a transaction may be initiated in a terminal 110 by entering a transaction amount into the terminal 110, e.g., using a numeric keypad or the like, by receiving input from another device, e.g., an electronic cash register, or by using or some other mechanism provided as part of or in conjunction with terminal 110.

Next, in step 410, the module 115 determines a transaction type. For example, possible transaction types include payment card transactions and cash transactions. In the case of a payment card transaction, information concerning a payment card is provided to terminal 110, generally by a customer or employee of merchant 105 swiping the payment card through a magnetic card reader, using radio-frequency identification (RFID) to read a tag, e.g., a chip, in a payment card, etc., thereby allowing terminal 110 to obtain information from a magnetic strip included on the payment card. Further, other mechanisms may be used to provide information concerning the payment card, or may be used to provide input to the terminal 110 indicating a cash transaction, such as manual entry of information, etc. In any event, information obtained in step 410 may be stored in a type indicator maintained by the EDC module 115, the type indicator indicating that a transaction is a cash transaction or a payment card transaction. In the case of a payment card transaction, the terminal may also capture information such as a unique identifier for the payment card, e.g., a card number, a name of a cardholder, a type of card, e.g., debit or credit, and/or MasterCard, Visa, American Express, Discover, etc.

Next, in step 415, the EDC module 115 determines whether the transaction amount determined in step 405 is above the threshold 210, e.g., such as may be stored in a non-volatile memory of the terminal 110. If the transaction amount is above a threshold 210, then step 420 is executed next. Otherwise, the module 115 proceeds to step 435.

In step 420, service fee 205 is applied, i.e., added, to the transaction amount determined in step 405, thereby resulting in a total transaction amount that is the transaction amount plus the service fee 205. The service fee 205 may be stored in a non-volatile memory of the terminal 110, may be included in program code of the EDC module 115, etc.

Next, in step 425, EDC module 115 determines whether the current transaction is a cash transaction. If yes, step 430 is executed next. Otherwise, step 435 is executed next.

In step 430, EDC module 115 applies cash discount 215 to the total transaction amounts. Thus, after step 430 is executed, the total transaction amount is the transaction amount determined in step 405, plus the service fee 205 applied in step 420, less the cash discount 215. Step 435 is executed following step 430.

In step 435, the transaction is processed, meaning that terminal 110 receives input indicating that a cash transaction is complete, processes a payment card transaction, e.g., as discussed below with respect to FIG. 5, or in some other manner indicates that a transaction is complete. As part of processing the transaction, the terminal 110 generally displays and/or prints a customer receipt that includes information such as the transaction amount, total transaction amounts, applicable tax, amount of a service fee 205, and/or amount of a cash discount 215, as applicable. Further steps for processing payment card transactions are described below with respect to FIG. 5.

Following step 435, the process 400 ends.

Note that the service fee 205, threshold 210, and cash discount 215 may all be configurable. For example, a merchant could access the terminal 110, e.g., using a special identifier and/or password or the like to configure parameters such as the service fee 205, the threshold 210, and the cash discount 215 using an input device such as a keyboard, a numeric keypad of the terminal 110, etc. More often, the terminal 110 is configured remotely, e.g., by instructions provided from server 130 or some other remote device controlled from payment processing center 125. Thus, payment processing center 125 could send instructions to the terminal 110 concerning values to use for the service fee 205, the threshold 210, and/or the cash discount 205. In addition, EDC module 115 could be programmed to retrieve such values via network 120, e.g., from data store 135 via server 130.

Figure 5:
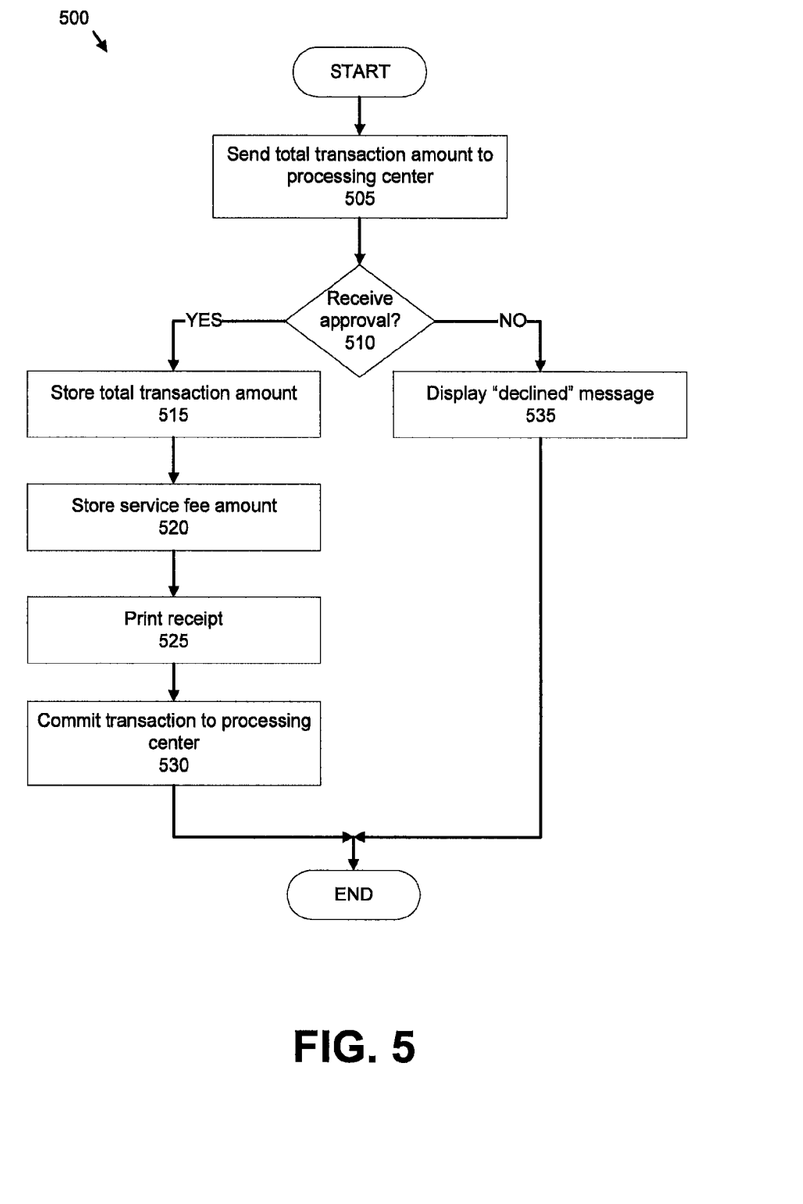
FIG. 5 illustrates an exemplary process for processing a payment card transaction using an electronic draft capture (EDC) module.

FIG. 5 illustrates an exemplary process 500 for processing a payment card transaction using an electronic draft capture (EDC) module 115 configured to charge a service fee 205. For example, if the transaction processed as described with respect to FIG. 4 is a payment card transaction, process 500 may include steps carried out when process 400 reaches process transaction step 435, described above.

Process 500 begins in a step 505 when terminal 110, according to instructions in the EDC module 115, sends a total transaction amount, i.e., an amount that includes a service fee 205, to payment processing center 125.

Next, in step 510, the EDC module 115 determines whether an approval of the transaction has been received from payment processing center 125. Steps by which payment processing center 125 may determine whether to provide such approval are discussed further below with respect to FIG. 6. If a transaction, including the total transaction amount provided as described above with respect to step 505, is approved, then step 515 is executed next. Otherwise, step 535 is executed next.

In step 515, EDC module 115 causes a total transaction amount, i.e., the amount provided as described above with respect to step 505, to be stored in a memory or on other media included in terminal 110.

Next, in step 520, EDC module 115 causes an amount of the service fee 205 to be stored in a memory or on other media included in terminal 110, and associates the amount with an identifier for a particular transaction, where information stored concerning the transaction includes the total transaction amount stored in step 515. Such information is stored, among other things, for reporting purposes, e.g., to create batch report 300 discussed herein with respect to FIG. 3, and also so that necessary information concerning a transaction may be communicated to payment processing center 125, e.g., as described below with respect to step 530.

Next, in step 525, as described above with respect to step 435 of process 400, terminal 110 may print and/or display a receipt to be provided to a customer.

Next, in step 530, EDC module 115 causes the transaction to be committed to payment processing center 125; as is known, transactions may be committed from terminal 110 to payment processing center 125 in batch, or on a real-time or near real time basis. That is, a transaction may be sent to payment processing center either as a host closed sale (HCS) transaction, or as a terminal closed sale (TCS) transaction.

As discussed above, in addition to step 515, step 535 may follow step 510. In step 535, EDC module 115 causes terminal 110 to display a "declined" message or the like, indicating that approval for a transaction requested as described above with respect to step 505 has not been received from payment processing center 125.

Following either step 530 or step 535, process 500 ends.

Figure 6:
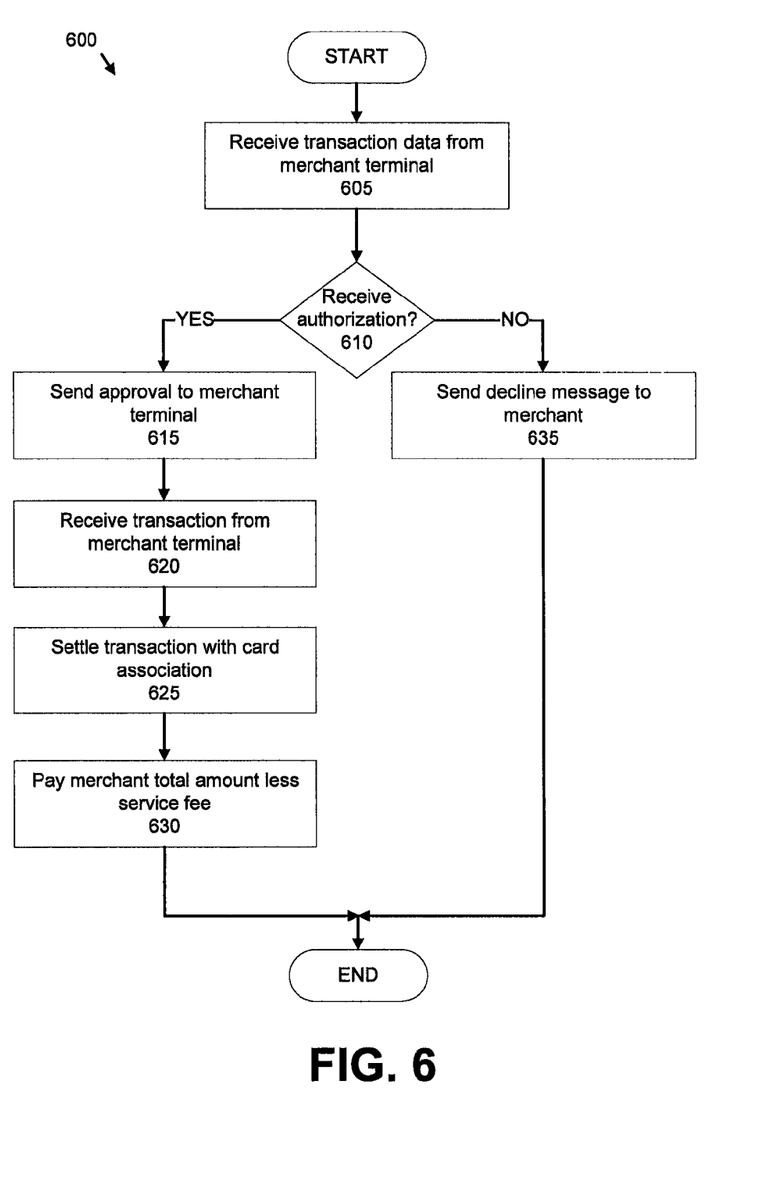
FIG. 6 illustrates an exemplary process for a payment processing center to process a payment card transaction that includes a service fee.

FIG. 6 illustrates an exemplary process 600 for payment processing center 125 to process a payment card transaction that includes a service fee 205. It will be understood that certain operations attributed herein to payment processing center 125 may be carried out as appropriate by server 130 and/or data store 135.

Process 600 begins in a step 605 when payment processing center 125 receives data relating to a payment card transaction from a merchant terminal 110.

Next, in step 610, payment processing center 125 attempts to obtain, from card association 145, authorization for the transaction communicated in step 605. If such authorization is obtained, step 615 is executed next. Otherwise, step 635 is executed next.

In step 615, payment processing center 125 sends an indication to terminal 110 that the transaction for which information was provided in step 605 is approved.

Next, in step 620, payment processing center 125 receives information from merchant terminal 110 indicating that the transaction has been completed. Such information, in addition to identifiers and the like for the transaction, the payment card used in the transaction, merchant 105, terminal 110, etc., generally includes a total transaction amount, as well as an amount of a service fee 205 included in the total transaction amount.

Next, in step 625, payment processing center 125 settles the transaction with card association 145. Settlement processes for payment card transactions are well known. In settling a transaction with card association 145 according to process 600, payment processing center 125 provides to card association 145 a total transaction amount that includes an amount paid for goods and/or services, any applicable tax, and also the applicable interchange/processing fee 210. Accordingly, from the perspective of card association 145, it is irrelevant that process 600 involves a transaction using a service fee 205. Even in a transaction involving a service fee 205, card association 145 receives an interchange/processing fee 215, just as it would for any other transaction.

Next, in step 630, payment processing center 125 pays to merchant 105, e.g., according to Automated Clearing House (ACH) mechanisms such as are known, a total transaction amount less the applicable service fee 205. The amount paid according to step 630 may sometimes be referred to as a "net deposit amount" for the transaction.

As discussed above, in addition to step 615, step 635 may follow step 610. In step 635, payment processing center 125 send a message to merchant terminal 110 indicating that authorization has been declined for the transaction indicated as described above with respect to step 605.

Following either step 630 or step 635, process 600 ends.

Batch Reports

Figure 3:
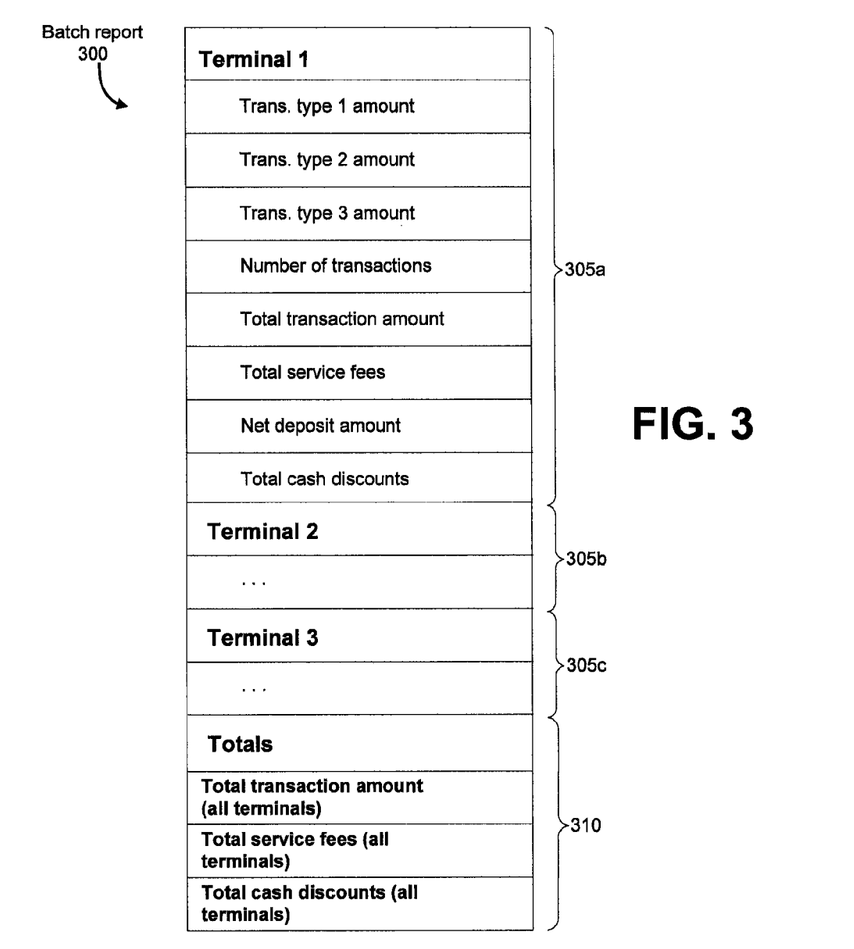
FIG. 3 illustrates an exemplary batch report.

FIG. 3 illustrates an exemplary batch report 300, such as may be produced by a terminal 110 according to processor-executable instructions included in a memory therein, e.g., in reporting module 112. Batch reports 300 provide a user at merchant 105 with information concerning transactions processed, in a given period of time, e.g., one business day, in one or more terminals 110. For example, the batch report 300 shown in FIG. 3 includes a first sub-report 305a concerning transactions processed by a first terminal 110, a second sub-report 305b concerning transactions processed by a second terminal 110, a third sub-report 305c concerning transactions processed by a third terminal 110 concerning transactions processed by all three terminals 110, i.e., summarizing all transactions processed by a merchant location 105. Note that the subreports 305 could be provided by themselves directly from respective terminals 110, or according to data collected by payment processing center 125, e.g. by server 130 and stored in data store 135, and that payment processing center 125, e.g., server 130, could further provide batch reports 300.

In the example of FIG. 3, a sub-report 305 includes fields for showing total transaction amounts in the given period of time related to each of one or more transaction types, e.g., different types of payment cards, cash transactions, etc. Sub-report 305 also includes a field for showing a total number of transactions processed by the terminal 110 in the given period of time. Related to those transactions, sub-report 305 also includes fields for showing a total amount of the transactions, i.e., an aggregation of the total transaction amounts discussed above, a total amount of service fees 205 charged to customers for the transactions, a total amount of cash discounts 215 provided to customers for the transactions, and a net deposit amount credited to merchant 105 based on the transactions.

Sub-report 315 includes a field for showing a total amount of transactions processed by all terminals 110 reflected on batch report 300 in the time period covered by the batch report 300, a field showing a total amount of service fees 205 charged through the terminals 110, and a field showing a total amount of cash discounts 215 charged through the terminals 110. Although not shown in FIG. 3, sub-report 315 could also include other fields, such as a field for showing a total number of transactions processed by all terminals 110 reflected on batch report 300, a field showing total net deposits, etc. Thus, in the example of FIG. 3, the total transaction amount of sub-report 305 and the net transaction amount of sub-report 310, which is also a total transaction amount, may be summed to provide the total amount of transactions shown on sub-report 315. Further, the number of transactions shown on sub-report 305 and the number of transactions shown on sub-report 310 may be summed to provide the total number of transactions shown on sub-report 315.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
    receiving, in a computing device that includes a processor and a memory, inputs including indications of a transaction amount and a type of transaction;
    determining whether the transaction amount exceeds a predetermined threshold;
    determining the type of transaction to be one of a cash transaction and a payment card transaction; and
    if the type of transaction is a cash transaction and not a payment card transaction, and if the transaction amount exceeds the predetermined threshold, adding to the transaction amount a predetermined service fee, and subtracting from the transaction amount, and not from the service fee, a predetermined discount.

2. The method of claim 1, further comprising, if the type of transaction is a payment card transaction and not a cash transaction, and if the transaction amount exceeds the predetermined threshold, adding to the transaction amount the predetermined service fee without subtracting the predetermined discount from the transaction amount.

3. The method of claim 2, further comprising paying a percentage-based fee to a card association based on the payment card transaction.

4. The method of claim 1, further comprising, if the transaction amount does not exceed the threshold, processing the transaction without applying the service fee regardless of the type of transaction.

5. The method of claim 1, wherein the discount exceeds the service fee.

6. The method of claim 1, further comprising generating, in the computing device, a report that includes a total amount of service fees charged, and a total amount of discounts provided, in a given time period.

7. The method of claim 1, further comprising, if the transaction amount does not exceed the threshold, and the transaction is a cash transaction, processing the transaction without applying the discount.

8. A computer-readable medium tangibly embodying instructions executable by a computer processor, the instructions including instructions for:
    receiving inputs including indications of a transaction amount and a type of transaction;
    determining whether the transaction amount exceeds a predetermined threshold;
    determining the type of transaction to be one of a cash transaction and a payment card transaction; and
    if the type of transaction is a cash transaction and not a payment card transaction, and if the transaction amount exceeds the predetermined threshold, adding to the transaction amount a predetermined service fee, and subtracting from the transaction amount, and not from the service fee, a predetermined discount.

9. The medium of claim 8, the instructions further including instructions for, if the type of transaction is a payment card transaction and the transaction amount exceeds the predetermined threshold, adding to the transaction amount the predetermined service fee.

10. The medium of claim 9, the instructions further including instructions for paying a percentage-based fee to a card association based on the payment card transaction.

11. The medium of claim 8, the instructions further including instructions for, if the transaction amount does not exceed the threshold, processing the transaction without applying the service fee regardless of the type of transaction.

12. The medium of claim 8, wherein the discount exceeds the service fee.

13. The medium of claim 8, the instructions further including instructions for generating a report that includes a total amount of service fees charged, and a total amount of discounts provided, in a given time period.

14. The medium of claim 8, the instructions further including instructions for, if the transaction amount does not exceed the threshold, and the transaction is a cash transaction, processing the transaction without applying the discount.

15. A computing device having a processor and a memory, the device being configured to:
receive inputs including indications of a transaction amount and a type of transaction;
determine whether the transaction amount exceeds a predetermined threshold;
determine the type of transaction to be one of a cash transaction and a payment card transaction; and
if the type of transaction is a cash transaction and not a payment card transaction, and if the transaction amount exceeds the predetermined threshold, adding to the transaction amount a predetermined service fee, and subtracting from the transaction amount, and not from the service fee a predetermined discount.

16. The device of claim 15, further configured to, if the type of transaction is a payment card transaction and not a cash transaction, and if the transaction amount exceeds the predetermined threshold, adding to the transaction amount the predetermined service fee without subtracting the predetermined discount from the transaction amount.

17. The device of claim 16, further configured to pay a percentage-based fee to a card association based on the payment card transaction.

18. The device of claim 15, further configured to, if the transaction amount does not exceed the threshold, process the transaction without applying the service fee regardless of the type of transaction.

19. The device of claim 15, wherein the discount exceeds the service fee.

20. The device of claim 15, further configured to generate, in the device, a report that includes a total amount of service fees charged, and a total amount of discounts provided, in a given time period.

21. The device of claim 15, further configured to, if the transaction amount does not exceed the threshold, and the transaction is a cash transaction, process the transaction without applying the discount.

22. A method, comprising:
receiving, in a computing device that includes a processor and a memory, inputs including indications of a transaction amount and a type of transaction;
determining whether the transaction amount exceeds a predetermined threshold;
determining the type of transaction to be one of a cash transaction and a payment card transaction; and
if the type of transaction is a cash transaction and not a payment card transaction, and if the transaction amount exceeds the predetermined threshold, adding to the transaction amount a predetermined service fee, and subtracting from the transaction amount, and not from the service fee, a predetermined discount; wherein the discount exceeds the service fee.

* * * * *

UNITED STATES PATENT AND TRADEMARK OFFICE
CERTIFICATE OF CORRECTION

| | | |
|---|---|---|
| PATENT NO. | : 8,131,619 B1 | |
| APPLICATION NO. | : 13/076562 | |
| DATED | : March 6, 2012 | |
| INVENTOR(S) | : Randall D. Veselka | |

It is certified that error appears in the above-identified patent and that said Letters Patent is hereby corrected as shown below:

In the Claims:

At column 11, claim number 15, line number 16, change "the service fee a predetermined discount." to -- the service fee, a predetermined discount. --

Signed and Sealed this
Twenty-fourth Day of April, 2012

David J. Kappos
*Director of the United States Patent and Trademark Office*